US009111228B2

(12) United States Patent
Collica

(10) Patent No.: US 9,111,228 B2
(45) Date of Patent: Aug. 18, 2015

(54) SYSTEM AND METHOD FOR COMBINING SEGMENTATION DATA

(71) Applicant: SAS Institute Inc., Cary, NC (US)

(72) Inventor: Randall S. Collica, Derry, NH (US)

(73) Assignee: SAS Institute Inc., Cary, NC (US)

( * ) Notice: Subject to any disclaimer, the term of this patent is extended or adjusted under 35 U.S.C. 154(b) by 327 days.

(21) Appl. No.: 13/662,803

(22) Filed: Oct. 29, 2012

(65) Prior Publication Data

US 2014/0122401 A1 May 1, 2014

(51) Int. Cl.
*G06N 3/02* (2006.01)
*G06N 3/08* (2006.01)
*G06N 7/00* (2006.01)

(52) U.S. Cl.
CPC ................ *G06N 3/088* (2013.01); *G06N 7/005* (2013.01)

(58) Field of Classification Search
None
See application file for complete search history.

(56) References Cited

PUBLICATIONS

Kim, YongSeog. "Toward a successful CRM: variable selection, sampling, and ensemble." Decision Support Systems 41.2 (2006): 542-553.*

Kuo, R. J., L. M. Ho, and Clark M. Hu. "Integration of self-organizing feature map and< i> K</i>-means algorithm for market segmentation." Computers & Operations Research 29.11 (2002): 1475-1493.*

Jurek, Anna, and Danuta Zakrzewska. "Improving naïve Bayes models of insurance risk by unsupervised classification." Computer Science and Information Technology, 2008. IMCSIT 2008. International Multiconference on. IEEE, 2008.*

Cheng et al., Classifying the Segmentation of Customer Value Via RFM Model and RS Theory, Expert Systems with Applications 36 (2009), pp. 4176-4184.

Collica, Customer Segmentation and Clustering Using SAS Enterprise Miner, SAS Institute, Inc., Cary, North Carolina (2011), 354 pages.

Strehl et al., Cluster Ensembles—A Knowledge Reuse Framework for Combining Multiple Partitions, Journal of Machine Learning Research 3 (2002), pp. 583-617.

Wang et al., Nonparametric Bayesian Clustering Ensembles, Department of Computer Science, Department of Systems Engineering and Operations Research, George Mason University, Virginia (undated), 16 pages.

* cited by examiner

*Primary Examiner* — Kakali Chaki
*Assistant Examiner* — Kevin W Figueroa
(74) *Attorney, Agent, or Firm* — Kilpatrick Townsend & Stockton LLP

(57) ABSTRACT

Systems and methods are provided for combining multiple segmentations into a single unique segmentation that contains attributes of the original segmentations. This new segmentation forms an ensemble or combination segmentation that has a unique set of attributes from the original segmentations without enumerating every possible set of combinations. In one example, two or more segments are combined into a single segmentation using a technique such as k-means clustering or Self-Organizing Map Neural Networks. After the first combination phase is performed, a Bayesian technique is then applied in a second phase to adjust or further alter the ensemble combination of segments.

29 Claims, 11 Drawing Sheets

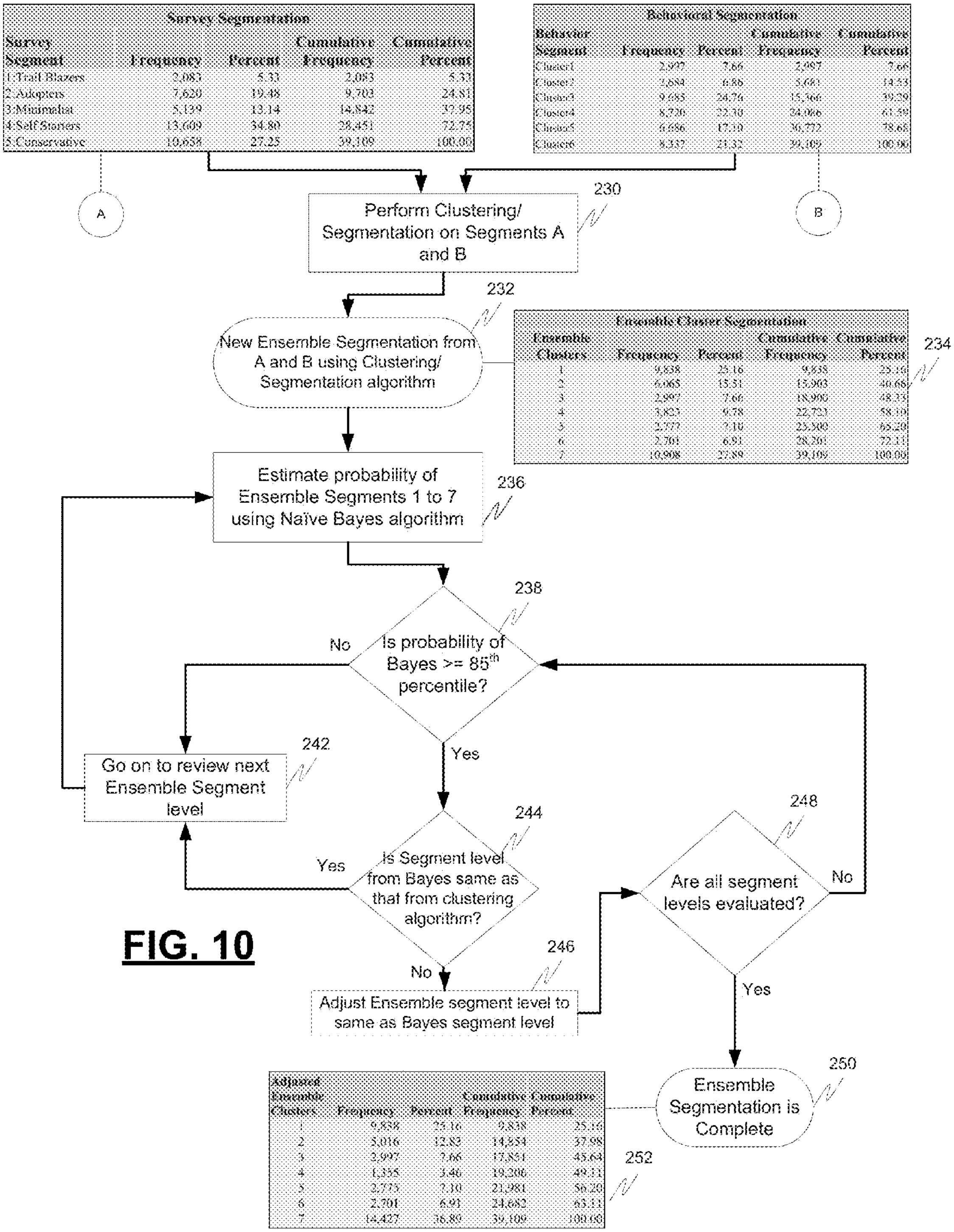

Survey Segmentation

| Survey Segment | Frequency | Percent | Cumulative Frequency | Cumulative Percent |
|---|---|---|---|---|
| 1:Trail Blazers | 2,083 | 5.33 | 2,083 | 5.33 |
| 2:Adopters | 7,620 | 19.48 | 9,703 | 24.81 |
| 3:Minimalist | 5,139 | 13.14 | 14,842 | 37.95 |
| 4:Self Starters | 13,609 | 34.80 | 28,451 | 72.75 |
| 5:Conservative | 10,658 | 27.25 | 39,109 | 100.00 |

Behavioral Segmentation

| Behavior Segment | Frequency | Percent | Cumulative Frequency | Cumulative Percent |
|---|---|---|---|---|
| Cluster1 | 2,997 | 7.66 | 2,997 | 7.66 |
| Cluster2 | 2,684 | 6.86 | 5,681 | 14.53 |
| Cluster3 | 9,685 | 24.76 | 15,366 | 39.29 |
| Cluster4 | 8,720 | 22.30 | 24,086 | 61.59 |
| Cluster5 | 6,686 | 17.10 | 30,772 | 78.68 |
| Cluster6 | 8,337 | 21.32 | 39,109 | 100.00 |

Ensemble Cluster Segmentation

| Ensemble Clusters | Frequency | Percent | Cumulative Frequency | Cumulative Percent |
|---|---|---|---|---|
| 1 | 9,838 | 25.16 | 9,838 | 25.16 |
| 2 | 6,065 | 15.51 | 15,903 | 40.66 |
| 3 | 2,997 | 7.66 | 18,900 | 48.33 |
| 4 | 3,823 | 9.78 | 22,723 | 58.10 |
| 5 | 2,777 | 7.10 | 25,500 | 65.20 |
| 6 | 2,701 | 6.91 | 28,201 | 72.11 |
| 7 | 10,908 | 27.89 | 39,109 | 100.00 |

| Adjusted Ensemble Clusters | Frequency | Percent | Cumulative Frequency | Cumulative Percent |
|---|---|---|---|---|
| 1 | 9,838 | 25.16 | 9,838 | 25.16 |
| 2 | 5,016 | 12.83 | 14,854 | 37.98 |
| 3 | 2,997 | 7.66 | 17,851 | 45.64 |
| 4 | 1,355 | 3.46 | 19,206 | 49.11 |
| 5 | 2,775 | 7.10 | 21,981 | 56.20 |
| 6 | 2,701 | 6.91 | 24,682 | 63.11 |
| 7 | 14,427 | 36.89 | 39,109 | 100.00 |

FIG. 10

SYSTEM AND METHOD FOR COMBINING SEGMENTATION DATA

TECHNICAL FIELD

The technology described herein relates generally to data mining, and in particular, to combining multiple segmentations into a single unique segmentation that contains attributes of the original segmentations.

BACKGROUND

In many business applications, many competing segmentations of business data may exist. These competing segmentations may be derived from, for example, differing population subgroups such as age, gender, revenue, industry classification, purchase transaction quantities, etc. Segmentations may also be purchased from firms that perform segmentations as a professional service. As an example, Company A might provide a consulting Company B with some of Company A's customer data records, and Company B, using the provided data records performs a segmentation and provides the resulting segmentation model populated with customer data to Company A. Company A may use this new segmentation for marketing and sales and may desire to combine this new segmentation with other segmentations of Company A's customer data, such as segmentations regarding revenue generated per customer or segmentations regarding customer longevity forming an ensemble segmentation.

SUMMARY

In accordance with the teachings provided herein, systems and methods are provided for combining multiple segmentations into a single unique segmentation that contains attributes of the original segmentations. This new segmentation forms an ensemble or combination segmentation that has a unique set of attributes from the original segmentations without enumerating every possible set of combinations.

An example computing system is provided for performing data mining operations on data wherein the computing system comprises one or more processors for executing computer software instructions, segmentation clustering software instructions encoded in non-transient storage for execution by the one or more processors, and segmentation adjustment software instructions encoded in the non-transient storage for execution by the one or more processors. The segmentation clustering software instructions are configured to cause the computer system to receive segmentation data from two or more segmentation clusters and create an ensemble segmentation having multiple segment levels from the two or more segmentation clusters. The segmentation adjustment software instructions are configured to cause the computer system to generate probability estimates for each segment level in the ensemble segmentation, determine whether any of the probability estimates in each segment level is greater than a predetermined threshold level, and, based upon determining that at least one of the probability estimates for a respective segment level is greater than a predetermined threshold level, adjust that segment level if an adjustment is indicated. After adjustments have been performed to one or more segment levels, the computing system is configured to produce a final ensemble segmentation.

In one example, two or more segments are combined into a single segmentation using a technique such as k-means clustering or Self-Organizing Map Neural Networks. After the first combination phase is performed, a Bayesian technique is then applied in a second phase to adjust or further alter the ensemble combination of segments.

In another example a Naïve Bayesian classification is applied in a second phase, which estimates the Bayes probability of the new single segmentation that forms an ensemble of the input segmentations. After the Bayesian estimation, assessments of the newly formed combined segmentation are made based on a threshold of the probability estimates. The final segmentation is adjusted based on the probability assessments. This method allows for the information content from the original segmentations to be retained in the process of the combined segmentations.

BRIEF DESCRIPTION OF THE DRAWINGS

FIG. 10 is a process flow chart providing an example of the generation of an ensemble segmentation from two segmentations A and B.

DETAILED DESCRIPTION

Figure 1:
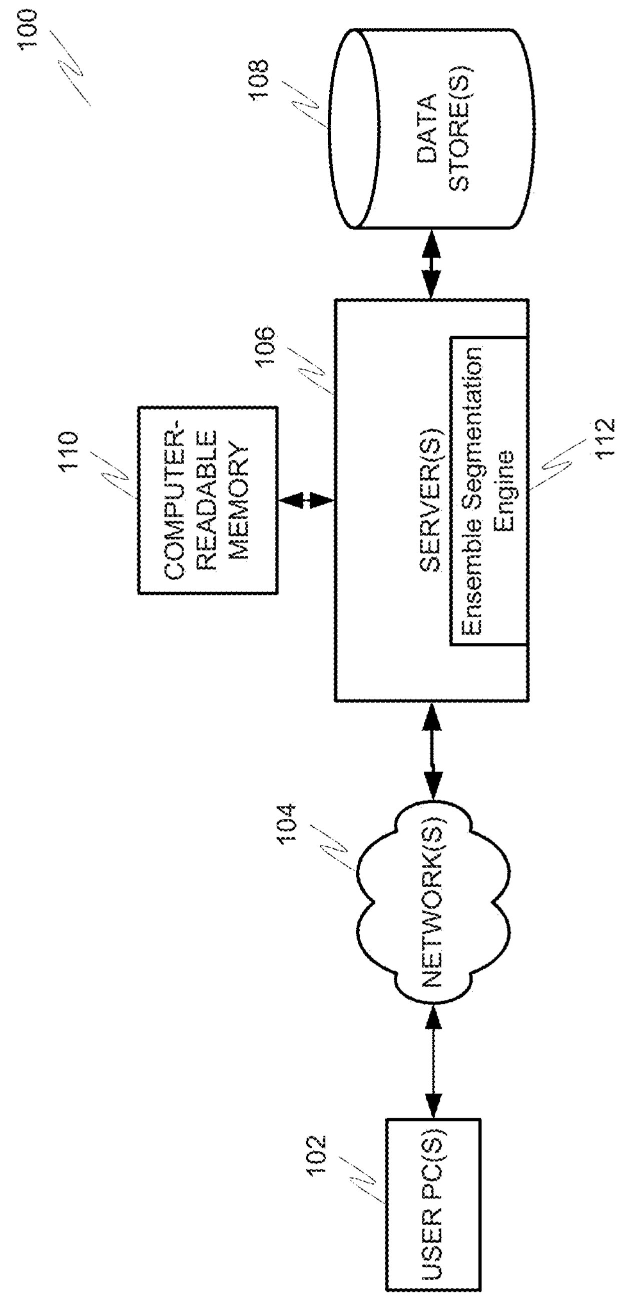
FIG. 1 is a block diagram depicting an example environment wherein users can interact with a computing environment that can perform data mining.

FIG. 1 depicts at 100 a computing environment for processing data for many different types of applications, such as for scientific, technical or business applications. One or more user computers 102 can interact with the computing environment 100 through a number of ways, including a network 104. The computing environment 100 may include one or more servers or data processors 106. One or more data stores 108 may be coupled to the servers 106 to store data to be processed in the computing environment 100 as well as to store any intermediate or final data generated by the computing environment. Computer-readable memory 110 may also be coupled to the servers 104 for use by the servers 104 when processing data. An example application for the computing environment 100 involves the performance of data mining, in general, and combining multiple segmentations into a single unique segmentation that contains attributes of the original segmentations, in particular. To help perform data mining, the example computing environment 100 includes an ensemble segmentation engine 112 that executes using the one or more servers 106 to combine multiple segmentations into a single unique segmentation.

Figure 2:
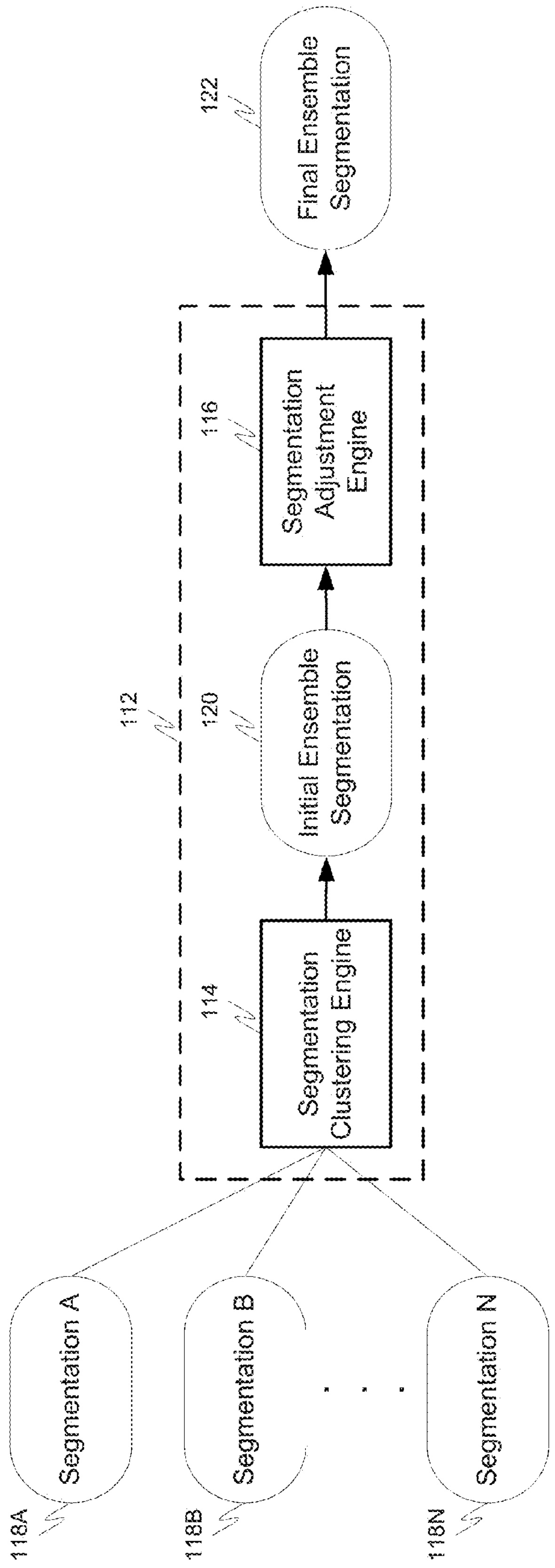
FIG. 2 is block diagrams depicting an example ensemble segmentation engine.

Depicted in FIG. 2 is a block diagram illustrating an example ensemble segmentation engine 112. The example ensemble segmentation engine 112 includes a segmentation clustering engine 114 and a segmentation adjustment engine 116. The segmentation clustering engine 114 is configured to receive two or more segmentation 118A-118N (segmentation A through Segmentation N in this example). The segmentation clustering engine 114 combines and segments the segmentations 118A-118N and generates an initial ensemble segmentation 120.

After the initial ensemble segmentation is formed, the segmentation adjustment engine 116 adjusts segments if an applied segmentation estimation technique indicates that adjustments are necessary. The applied estimation technique estimates the combined segmentation probabilities from the initial segmentation 120 and adjusts the segmentation based on predetermined criteria. After all adjustments are made, the final ensemble segmentation 122 is complete.

The segmentation clustering engine may be implemented by one or more processors executing programming instructions. The programming instructions may be stored in data stores and/or computer-readable memory. Similarly, the segmentation adjustment engine may be implemented by one or more processors executing programming instructions. The programming instructions may be stored in data stores and/or computer-readable memory.

Figure 3:
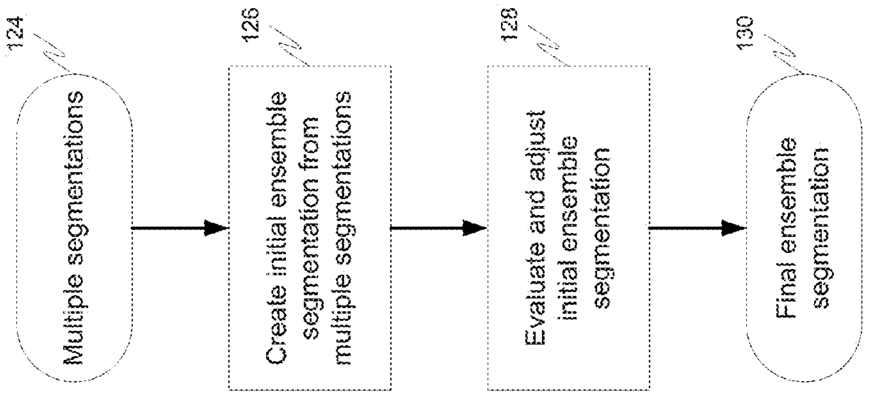
FIGS. 3-8 are process flow charts depicting example methods for combining multiple segmentations.

Depicted in FIG. 3 is a flow chart illustrating an example method for combining multiple segmentations. At step 124, multiple segmentations are retrieved. At step 126, a segmentation is performed on the multiple segmentations to create an initial ensemble segmentation. At step 128, the combined segmentation probabilities from the initial ensemble segmentation are estimated. The initial ensemble segmentation is adjusted if the segmentations differ significantly from predetermined criteria. After all adjustments are made, the final ensemble segmentation 130 is complete. The example method of FIG. 3 may be implemented by the system depicted in FIG. 2 or by other computer-implemented systems.

Figure 4:
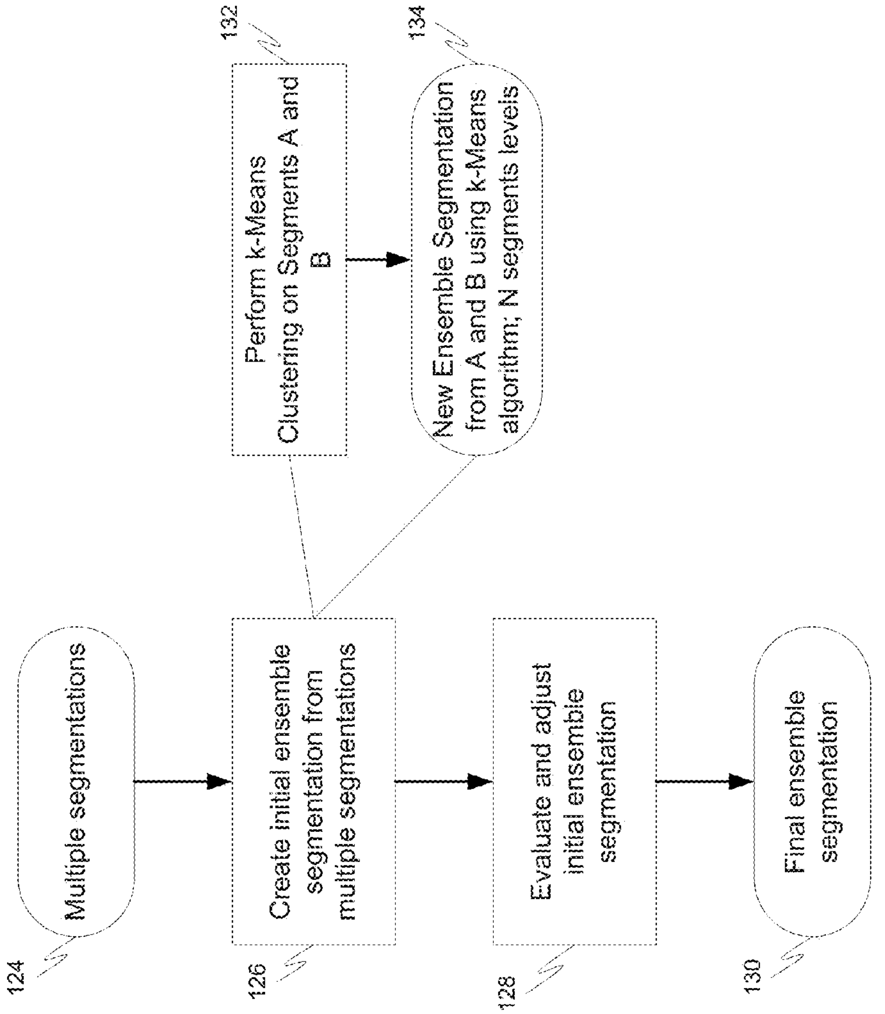

Depicted in FIG. 4 is a flow chart illustrating another example method for combining multiple segmentations. This example method is similar to the example method depicted in FIG. 3, and describes that an initial ensemble segmentation can be created using a K-means algorithm. At step 132, by performing k-means clustering on multiple input segmentations 124 using a k-means clustering algorithm (a number of which are well-known in the art), a new ensemble segmentation 134 can be generated. At step 128, the combined segmentation probabilities from the ensemble segmentation are estimated. The ensemble segmentation is adjusted if the segmentations differ significantly from predetermined criteria. After all adjustments are made, the final ensemble segmentation 130 is complete.

Figure 5:
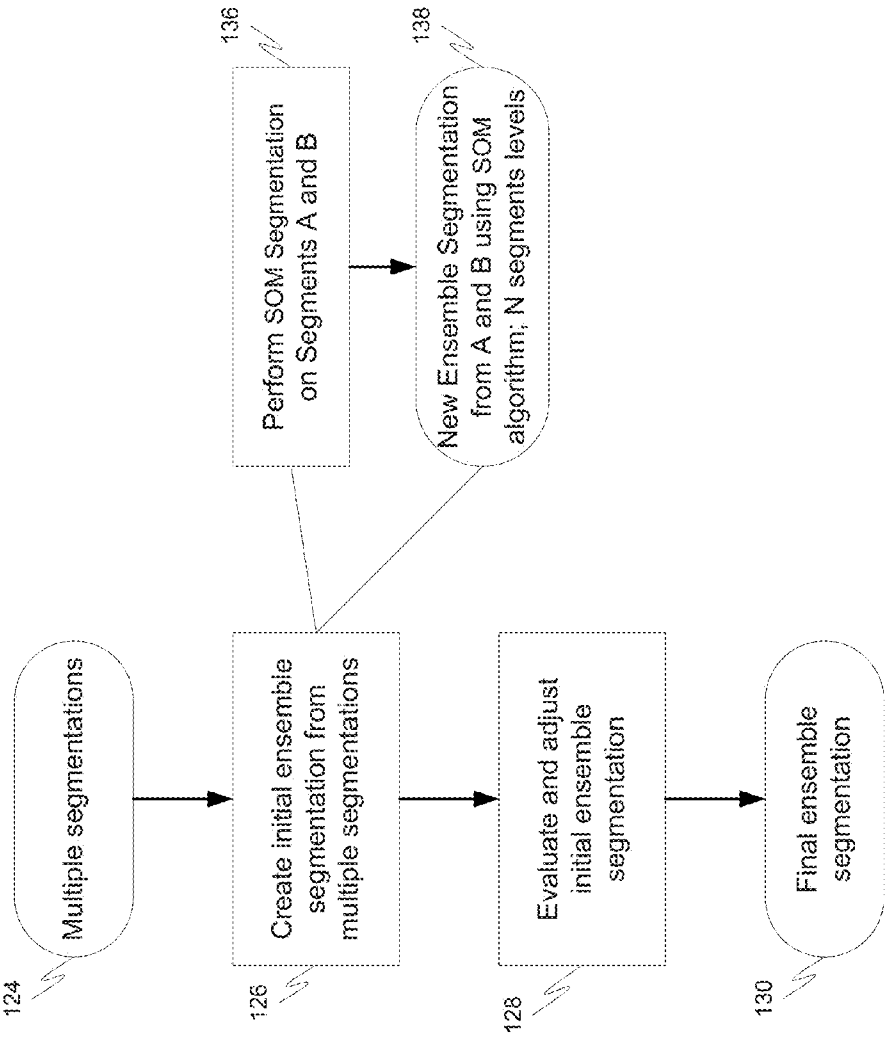

Depicted in FIG. 5 is a flow chart illustrating an additional example method for combining multiple segmentations. This example method is similar to the example method depicted in FIG. 3, and describes that ensemble segmentation can be created using Self-Organizing Map Neural Network ("SOM/NN") segmentation algorithm. At step 136, by performing clustering on multiple input segmentations 124 using a SOM/NN segmentation algorithm (a number of which are well-known in the art), a new ensemble segmentation 138 can be generated. At step 128, the combined segmentation probabilities from the ensemble segmentation are estimated. The ensemble segmentation is adjusted if the segmentations differ significantly from predetermined criteria. After all adjustments are made, the final ensemble segmentation 130 is complete.

Figure 6:
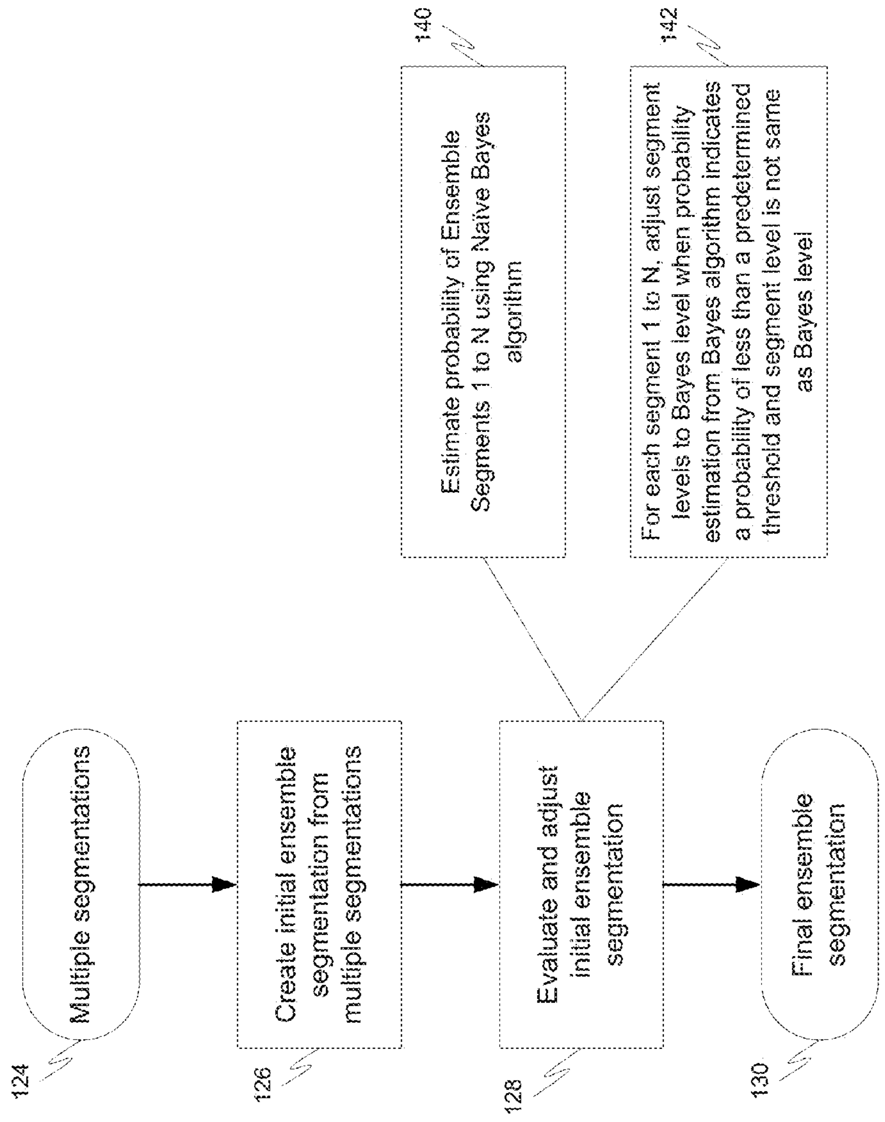

Depicted in FIG. 6 is a flow chart illustrating yet another example method for combining multiple segmentations into a single unique segmentation. This example method is similar to the example method depicted in FIG. 3, and describes that the combined segmentation probabilities of the initial ensemble segmentation can be estimated and adjusted using a Bayesian algorithm. At step 140, the probability of the data record observations belonging to an assigned segment level for each ensemble segment is estimated using a Naïve Bayes algorithm (a number of which are well-known in the art). As step 142, a data record observation's segment level is adjusted to the Bayes level when the probability estimate from the Bayes algorithm indicates a probability greater than or equal to a predetermined threshold and the segment level is not the same as the Bayes level. After all adjustments are made, the final ensemble segmentation 130 is complete.

Figure 7:
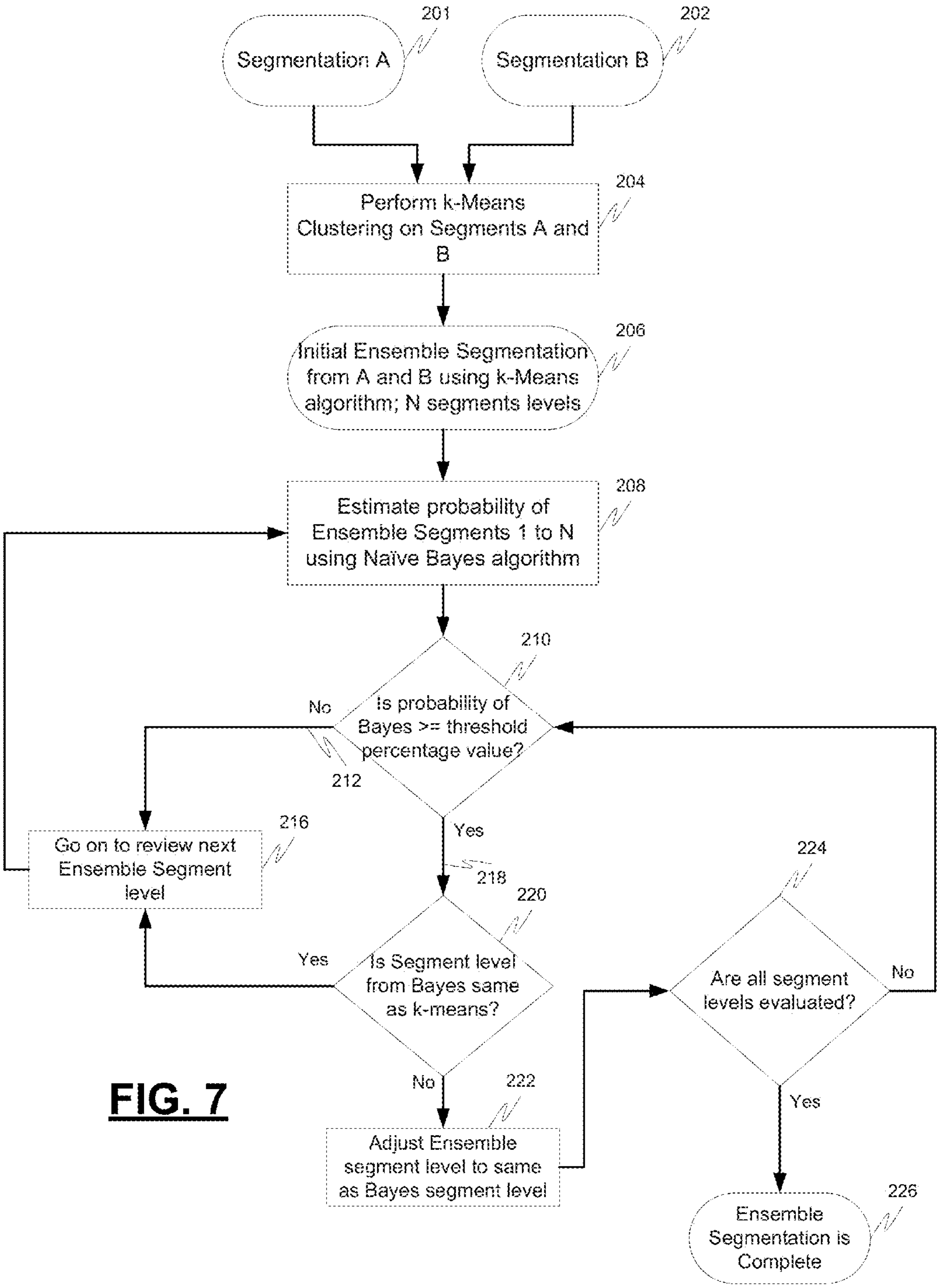

Depicted in FIG. 7 is a process flow chart illustrating another example method for combining multiple segmentations into a single unique segmentation. This method combines two or more segmentations into a single segmentation using a clustering algorithm followed by application of a Naïve Bayesian classification, which estimates the Bayes probability of the new single segmentation that forms an ensemble of the input segmentations. After the Bayesian estimation, assessments of newly formed combined segmentation are made based on a threshold of the probability estimates. The final segmentation is adjusted based on the probability assessments. This method allows the information content from the original segmentations to be retained in the process of the combined segmentations.

This method of combining two or more segmentations A and B together uses k-means clustering to cluster the segmentations together. After the k-means algorithm combines segmentations A and B, a Bayesian technique is applied to estimate the combined segmentation probabilities (proportions) and is used to adjust the segments within the segmentation when the segments differ significantly from the Bayes estimate. After all adjustments are made, the final ensemble segmentation is complete.

TABLE 1

Example Initial Segmentations to be Combined

| | Data Record | |
|---|---|---|
| Observation | Segmentation A | Segmentation B |
| 1 | A1 | B3 |
| 2 | A3 | B5 |
| 3 | A5 | B2 |
| 4 | A4 | B1 |
| 5 | A4 | B6 |
| 6 | A2 | B4 |
| 7 | A3 | B5 |

As an example, as illustrated in Table 1 (shown above), a data record may contain two segmentations, segmentation A and segmentation B. In this example, segmentation A contains 5 segments, segment A1 through segment A5, and segmentation B contains 6 segments, segment B1 through segment B6.

Applying the method of FIG. 7, combining segmentations A and B (201 and 202) involves combining the segment levels and not the original data from which the segment levels were derived. In other words, segments A1-A5 are to be combined with segments B1-B6. Table 2 illustrates how categorical segments A and B can be transformed into numeric levels in columns so that a k-Means algorithm can compute the distances necessary to assess cluster membership of the combined segments.

TABLE 2

Segment Levels from Table 1 into Numeric Binary Columns

| Data Record Observation | Seg. A1 | Seg. A2 | Seg. A3 | Seg. A4 | Seg. A5 | Seg. B1 | Seg. B2 | Seg. B3 | Seg. B4 | Seg. B5 | Seg. B6 |
|---|---|---|---|---|---|---|---|---|---|---|---|
| 1 | 1 | 0 | 0 | 0 | 0 | 0 | 0 | 1 | 0 | 0 | 0 |
| 2 | 0 | 0 | 1 | 0 | 0 | 0 | 0 | 0 | 0 | 1 | 0 |
| 3 | 0 | 0 | 0 | 0 | 1 | 0 | 1 | 0 | 0 | 0 | 0 |
| 4 | 0 | 0 | 0 | 1 | 0 | 1 | 0 | 0 | 0 | 0 | 0 |
| 5 | 0 | 0 | 0 | 1 | 0 | 0 | 0 | 0 | 0 | 0 | 1 |
| 6 | 0 | 1 | 0 | 0 | 0 | 0 | 0 | 0 | 1 | 0 | 0 |
| 7 | 0 | 0 | 1 | 0 | 0 | 0 | 0 | 0 | 0 | 1 | 0 |

At step 204 of FIG. 7, a k-Means algorithm is utilized to perform distance measurements on the data records illustrated in Table 2 for all observations in the data set, determine cluster membership, and create a new ensemble segmentation 206 that combines segmentations A and B. The new ensemble segmentation 206 is then evaluated at step 208 for the probability levels of Segmentations A and B to predict Segmentation 206. This is accomplished in this example using a Naïve Bayes estimation algorithm. In this example the Naïve Bayes estimation algorithm generates, for each data record observation, probability estimates for membership in each segment level in Segmentation 206.

Beginning at step 210, a decision is made regarding whether the Naïve Bayes probability estimation indicates a different classification for a data record observation. For each data record observation, if the Naïve Bayes probability estimate for a segment level indicates a probability less than a threshold value (path 212) then no adjustment is made relative to that data record observation. The probability estimates for the next segment level are selected for review after the probability estimates for all data record observations regarding the prior segment level have been considered (step 216).

If the Naïve Bayes probability estimation indicates a probability greater than or equal to a threshold value for a given data record observation (path 218), and it is determined that the segment level from Bayes is the same as the k-means segment level (step 220), then no adjustment is made to the segment level for the data record observation.

If the Naïve Bayes probability estimation indicates a probability greater than or equal to a threshold value for a given data record observation (path 218), and it is determined that the segment level from Bayes is not the same as the k-means segment level (step 220), then the segment level for the data record observation is adjusted to be equal to that indicated by the Bayes estimate (step 222).

If all segment levels have been evaluated (determined at decision step 224) then the ensemble segmentation is complete (step 226). If all segment levels have not been evaluated, then the next segment level is evaluated.

Figure 8:
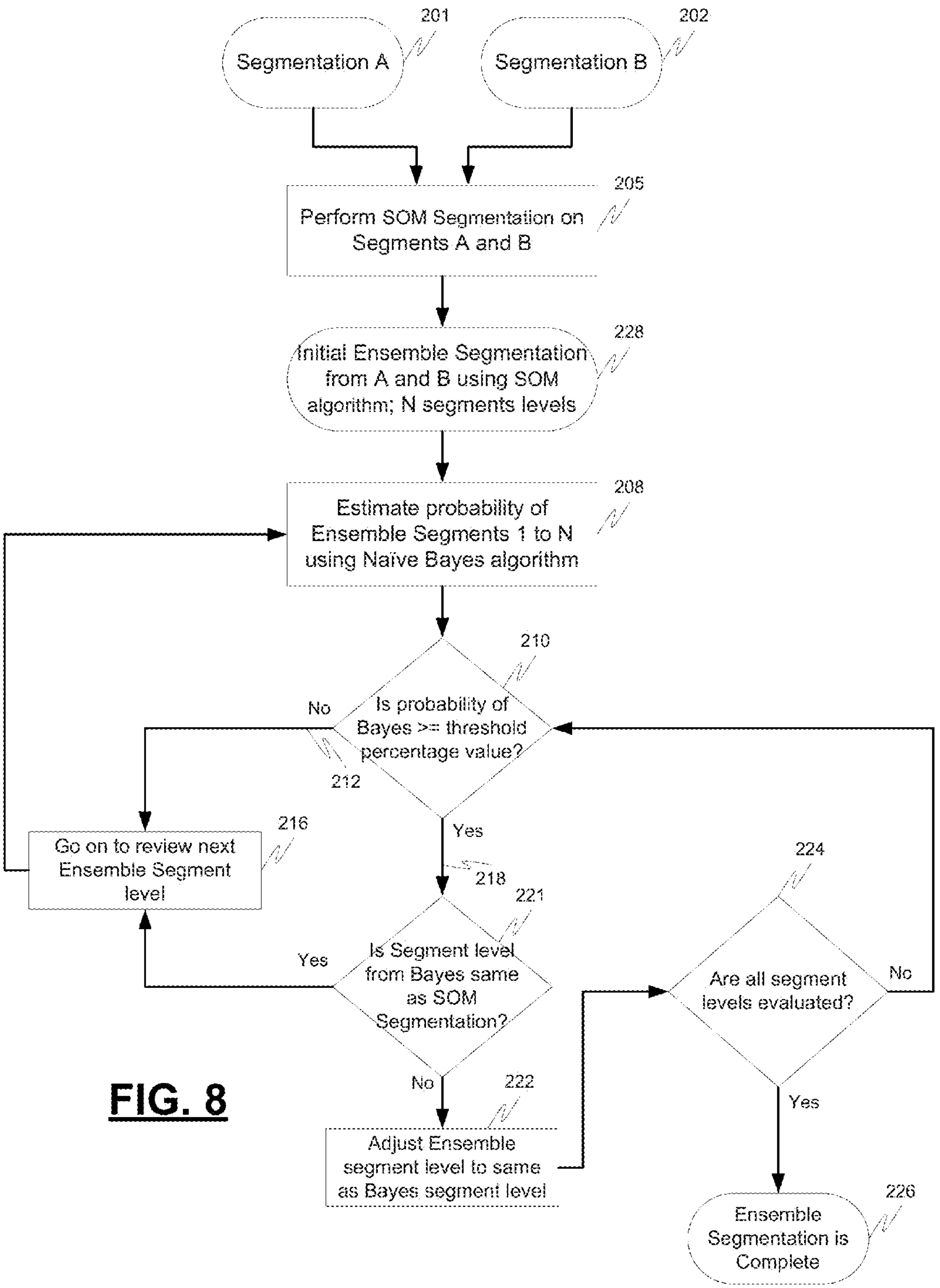

Depicted in FIG. 8 is a process flow chart illustrating another example method for combining multiple segmentations into a single unique segmentation. This method is similar to that of FIG. 7 except that a Self-Organizing Neural Network (SOM/NN) algorithm is used to combine segmentations A and B (step 205) to generate the initial ensemble segmentation 228.

At step 208, a Naïve Bayes algorithm is applied to estimate the probability of ensemble segments 1 to 7. Beginning at step 210, a decision is made regarding whether the Naïve Bayes probability estimation indicates a different classification for a data record observation. For each data record observation, if the Naïve Bayes probability estimate for a segment level indicates a probability less than a threshold value, then no adjustment is made relative to that data record observation (path 212). The probability estimates for the next segment level is selected for review after the probability estimates for all data record observations regarding the prior segment level have been considered (step 216).

If the Naïve Bayes probability estimation indicates (at decision step 210) a probability greater than or equal to the threshold value for a given data record observation, and it is determined (at decision step 221) that the segment level from Bayes is the same as the SOM/NN segment level, then no adjustment is made to the segment level for the data record observation.

If the Naïve Bayes probability estimation indicates (at decision step 210) a probability greater than or equal to the threshold value for a given data record observation, and it is determined (at decision step 221) that the segment level from Bayes is not the same as the SOM/NN segment level, then the segment level for the data record observation is adjusted to be equal to that indicated by the Bayes estimate (step 222).

If all segment levels have been evaluated (determined at decision step 224) then the ensemble segmentation is complete (step 226). If all segment levels have not been evaluated, then the next segment level is evaluated.

Figure 9:
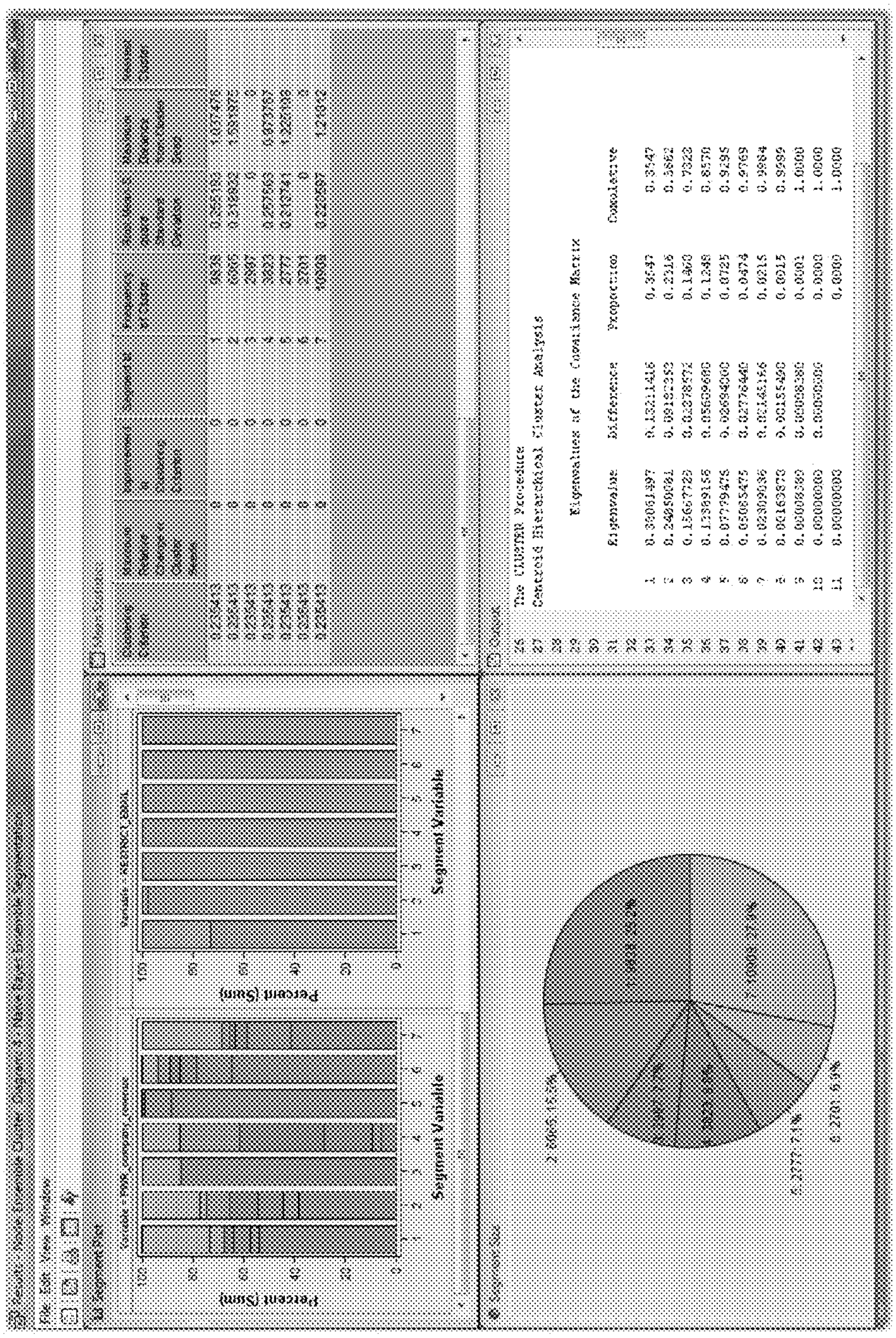
FIG. 9 is an example screenshot showing a combined set of results of the newly combined segmentation as a profile.

Depicted in FIG. 9 is a graphic image generated by a clustering engine such as the SAS Enterprise Miner™ cluster node from SAS Institute Inc. of Cary, N.C. This image depicts an example profile of segments that have been combined in an ensemble segmentation prior to the application of Naïve Bayes adjustments.

Depicted in FIG. 10 is a process flow chart illustrating an example of the generation of an ensemble segmentation from two segmentations A and B. In this example, the first segmentation (A) was developed from a survey of attitudes and a model to score these attitude segments on a larger data set. This survey segmentation contains five unique segments 1-5. The second segmentation (B) is a behavioral segmentation performed on the same data set as the attitudinal data using clustering from a clustering engine such as the SAS Enterprise Miner™ cluster node from SAS Institute Inc. of Cary, N.C.

At step 230, k-means clustering (step 232) is used to cluster the survey segmentation A and the behavioral segmentation B into a single segmentation (234). In this example, the ensemble cluster results in seven segments.

At step 236, a Naïve Bayes algorithm is applied to estimate the probability of ensemble segments 1 to 7. Beginning at step 238, a decision is made regarding whether the Naïve Bayes probability estimation indicates a different classification for a data record observation. For each data record observation, if the Naïve Bayes probability estimate for a segment level indicates a probability less than a threshold value, 85% in this example, then no adjustment is made relative to that data record observation. The probability estimates for the next segment level is selected for review after the probability estimates for all data record observations regarding the prior segment level have been considered (step 242).

If the Naïve Bayes probability estimation indicates (at decision step 238) a probability greater than or equal to the example 85% threshold value for a given data record observation, and it is determined (at decision step 244) that the segment level from Bayes is the same as the k-means segment level, then no adjustment is made to the segment level for the data record observation.

If the Naïve Bayes probability estimation indicates (at decision step 238) a probability greater than or equal to the example 85% threshold value for a given data record observation, and it is determined (at decision step 244) that the segment level from Bayes is not the same as the k-means segment level, then the segment level for the data record observation is adjusted to be equal to that indicated by the Bayes estimate (step 246).

If all segment levels have been evaluated (determined at decision step 248) then the ensemble segmentation is complete (step 250). If all segment levels have not been evaluated, then the next segment level is evaluated.

Example results of Naïve Bayes adjustments are illustrated at 252. Adjustments were made on segments 2, 4, 5, and 7. Segments 1, 3, and 6 were not changed by the Naïve Bayes probability adjustments.

This method combines the segments without referring to the original data that formed the segments. This method uses a two-step approach to forming and refining the combined segments. In the illustrated examples a k-means cluster algorithm followed by a Naïve Bayes estimation technique or a SOM/NN and again followed by the Naïve Bayes technique were used. Using a k-means cluster algorithm or a SOM/NN can simplify the process of combining segmentations. Adjusting to a Bayes probability can provide greater accuracy for optimally combining the input segmentations.

Referring back to FIGS. 1 and 2, depicted are examples of systems that may be used to combine multiple segmentations into a single unique segmentation. FIG. 1, in particular, depicts an example client/server environment, and FIG. 2 depicts a system that can be used in either a standalone environment or a client/server environment.

Figure 11:
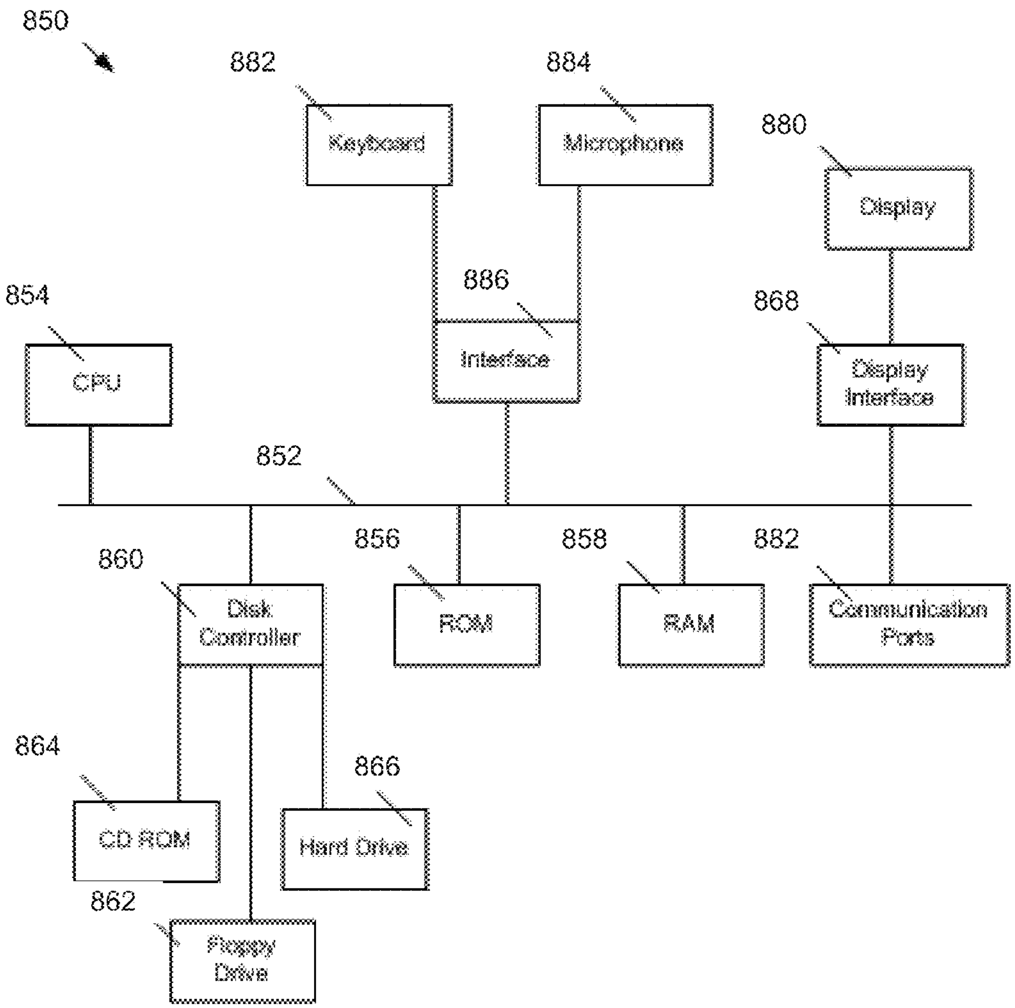
FIG. 11 is a block diagram of example hardware for either a standalone or client/server computer architecture.

FIG. 11 shows a block diagram of example hardware for either standalone or client/server computer architecture 850, such as the architecture depicted in FIGS. 1 and 2 that may be used to contain and/or implement the program instructions of system embodiments of the present invention. A bus 852 may connect the other illustrated components of the hardware. A processing system 854 labeled CPU (central processing unit) (e.g., one or more computer processors), may perform calculations and logic operations required to execute a program. A processor-readable storage medium, such as read only memory (ROM) 856 and random access memory (RAM) 858, may be in communication with the processing system 854 and may contain one or more programming instructions for performing an index join operation. Optionally, program instructions may be stored on a computer readable storage medium such as a magnetic disk, optical disk, recordable memory device, flash memory, or other physical storage medium. Computer instructions may also be communicated to other systems, components or devices.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 852 to be displayed on a display 870 in audio, graphic, or alphanumeric format. Communication with external devices may optionally occur using various communication ports 872.

In addition to the standard computer-type components, the hardware may also include data input devices, such as a keyboard 873, or other input device 874, such as a microphone, remote control, pointer, mouse and/or joystick.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computing system for performing data mining operations on data, the computing system comprising:

one or more processors for executing computer software instructions;

segmentation clustering software instructions encoded in non-transient storage for execution by the one or more processors, the segmentation clustering software instructions configured to cause the computer system to:

receive segmentation data from two or more segmentation clusters;

determine a plurality of segment levels for the segmentation data from each of the two or more segmentation clusters; and create an ensemble segmentation from the two or more segmentation clusters by combining multiple segment levels from the determined plurality of segment levels, wherein creating the ensemble segmentation involves combining the multiple segment levels and not original data from which the plurality of segment levels were derived; and segmentation adjustment software instructions encoded in the non-transient storage for execution by the one or more processors, the segmentation adjustment software instructions configured to cause the computer system to:

generate probability estimates for each segment level in the ensemble segmentation;

determine whether any of the probability estimates in each segment level is greater than a predetermined threshold level; and based upon determining that at least one of the probability estimates for a respective segment level is greater than a predetermined threshold level, adjust that segment level, wherein the computing system is configured to produce a final ensemble segmentation after adjustments have been performed to one or more segment levels.

2. The system according to claim 1 wherein the segmentation clustering software instructions are configured to cause the computer system to create the ensemble segmentation by providing instructions for performing a k-Means clustering algorithm.

3. The system according to claim 1 wherein the segmentation clustering software instructions are configured to cause the computer system to create the ensemble segmentation by providing instructions for performing a Self-Organizing Map Neural Network segmentation algorithm.

4. The system according to claim 1 wherein the segmentation adjustment software instructions are configured to cause the computer system to generate probability estimates for each ensemble segment level by providing instructions for performing a Bayesian classification.

5. The system according to claim 4 wherein the Bayesian classification comprises a Naive Bayes algorithm.

6. The system according to claim 1 wherein the segmentation adjustment software instructions are configured to cause the computer system to adjust an ensemble segment level to a Bayes level.

7. The system according to claim 6 wherein the segmentation adjustment software instructions are configured to cause the computer system to adjust an ensemble segment level to a Bayes level when one of the probability estimates for that segment level is greater than the predetermined threshold level and the segment level for a data record corresponding to that probability estimate is not the same as the Bayes level for that data record.

8. The system according to claim 1 wherein the plurality of segment levels is categorically transformed from a segmentation cluster.

9. A computing system for performing data mining operations on data, the computing system comprising:

non-transient computer readable storage; and an ensemble segmentation engine comprising one or more processors and configured by software instructions encoded on the non-transient computer readable storage, the ensemble segmentation engine configured to:

receive segmentation data from two or more segmentation clusters;

determine a plurality of segment levels for the segmentation data from each of the two or more segmentation clusters;

create an ensemble segmentation from the two or more segmentation clusters by combining multiple segment levels from the determined plurality of segment levels, wherein creating the ensemble segmentation involves combining the multiple segment levels and not original data from which the plurality of segment levels were derived;

generate probability estimates for each segment level in the ensemble segmentation;

determine whether any of the probability estimates in each segment level is greater than a predetermined threshold level; and based upon determining that at least one of the probability estimates for a respective segment level is greater than a predetermined threshold level, adjust that segment level;

wherein the computing system is configured to produce a final ensemble segmentation after adjustments have been performed to one or more segment levels.

10. The system according to claim 9 wherein the ensemble segmentation engine is configured to create the ensemble segmentation by performing a k-Means clustering algorithm.

11. The system according to claim 9 wherein the ensemble segmentation engine is configured to create the ensemble segmentation by performing a Self-Organizing Map Neural Network segmentation algorithm.

12. The system according to claim 9 wherein the ensemble segmentation engine is configured to generate probability estimates for each ensemble segment level by performing a Bayesian classification.

13. The system according to claim 12 wherein the Bayesian classification comprises a Naive Bayes algorithm.

14. The system according to claim 9 wherein the ensemble segmentation engine is configured to adjust an ensemble segment level to a Bayes level.

15. The system according to claim 14 wherein the ensemble segmentation engine is configured to adjust an ensemble segment level to a Bayes level when one of the probability estimates for that segment level is greater than the predetermined threshold level and the segment level for a data record corresponding to that probability estimate is not the same as the Bayes level for that data record.

16. A method in a computing system for performing data mining operations on data, the method comprising:

receiving segmentation data from two or more segmentation clusters;

determining a plurality of segment levels for the segmentation data from each of the two or more segmentation clusters;

creating an ensemble segmentation from the two or more segmentation clusters by combining multiple segment levels from the determined plurality of segment levels, wherein creating the ensemble segmentation involves combining the multiple segment levels and not original data from which the plurality of segment levels were derived;

generating probability estimates for each ensemble segment level in the ensemble segmentation;

determining whether any of the probability estimates in each segment level is greater than a predetermined threshold level; and based upon determining that at least one of the probability estimates for a respective segment level is greater than a predetermined threshold level, adjusting that segment level;

wherein a final ensemble segmentation is created after adjustments have been performed to one or more segment levels.

17. The method according to claim 16 wherein the creating comprises executing a k-Means clustering algorithm.

18. The method according to claim 16 wherein the creating comprises executing a Self-Organizing Map Neural Network segmentation algorithm.

19. The method according to claim 16 wherein the generating comprises performing a Bayesian classification.

20. The method according to claim 19 wherein the Bayesian classification comprises a Naive Bayes algorithm.

21. The method according to claim 16 wherein the adjusting comprises adjusting an ensemble segment level to a Bayes level.

22. The method according to claim 21 further comprising adjusting an ensemble segment level to a Bayes level when one of the probability estimates for that segment level is greater than the predetermined threshold level and the segment level for a data record corresponding to that probability estimate is not the same as the Bayes level for that data record.

23. A computer-program product for performing data mining operations on data, the computer-program product tangibly embodied in a machine-readable non-transitory storage medium and including instructions configured to cause a data processing apparatus to:

receive segmentation data from two or more segmentation clusters;

determine a plurality of segment levels for the segmentation data from each of the two or more segmentation clusters;

create an ensemble segmentation from the two or more segmentation clusters by combining multiple segment levels from the determined plurality of segment levels, wherein creating the ensemble segmentation involves combining the multiple segment levels and not original data from which the plurality of segment levels were derived;

generate probability estimates for each segment level in the ensemble segmentation;

determine whether any of the probability estimates in each segment level is greater than a predetermined threshold level; and based upon determining that at least one of the probability estimates for a respective segment level is greater than a predetermined threshold level, adjust that segment level;

wherein a final ensemble segmentation is created after adjustments have been performed to one or more segment levels.

24. computer-program product according to claim 23 wherein the instructions configured to cause a data processing apparatus to create an ensemble segmentation comprise instructions configured to cause a data processing apparatus to execute a k-Means clustering algorithm.

25. The computer-program product according to claim 23 wherein the instructions configured to cause a data processing apparatus to create an ensemble segmentation comprise instructions configured to cause a data processing apparatus to execute a Self-Organizing Map Neural Network segmentation algorithm.

26. The computer-program product according to claim 23 wherein the instructions configured to cause a data processing apparatus to generate probability estimates comprise instructions configured to cause a data processing apparatus to perform a Bayesian classification.

27. The computer-program product according to claim 26 wherein the Bayesian classification comprises a Naive Bayes algorithm.

28. The computer-program product according to claim 23 wherein the instructions configured to cause a data processing apparatus to adjust that segment level comprise instructions configured to cause a data processing apparatus to adjust an ensemble segment level to a Bayes level.

29. The computer-program product according to claim 28 further comprising instructions configured to cause a data processing apparatus to adjust an ensemble segment level to a Bayes level when one of the probability estimates for that segment level is greater than the predetermined threshold level and the segment level for a data record corresponding to that probability estimate is not the same as the Bayes level for that data record.

* * * * *

UNITED STATES PATENT AND TRADEMARK OFFICE

CERTIFICATE OF CORRECTION

PATENT NO. : 9,111,228 B2
APPLICATION NO. : 13/662803
DATED : August 18, 2015
INVENTOR(S) : Randall S. Collica It is certified that error appears in the above-identified patent and that said Letters Patent is hereby corrected as shown below:

In the Claims,

Column 12, line 15, please delete
"computer-program product"

And insert
--The computer-program product--

Signed and Sealed this
Twenty-sixth Day of January, 2016

Michelle K. Lee
*Director of the United States Patent and Trademark Office*